(12) United States Patent
Holveck et al.

(10) Patent No.: US 12,235,019 B2
(45) Date of Patent: Feb. 25, 2025

(54) RETROFIT HOT WATER HEAT PUMP

(71) Applicant: Lunar Energy, Inc., Mountain View, CA (US)

(72) Inventors: Mark Holveck, Sunnyvale, CA (US); Forest Samuel Nelson, Santa Clara, CA (US)

(73) Assignee: Lunar Energy, Inc., Mountain View, CA (US)

( * ) Notice: Subject to any disclaimer, the term of this patent is extended or adjusted under 35 U.S.C. 154(b) by 21 days.

(21) Appl. No.: 17/976,569

(22) Filed: Oct. 28, 2022

(65) Prior Publication Data

US 2023/0136851 A1  May 4, 2023

Related U.S. Application Data

(60) Provisional application No. 63/275,120, filed on Nov. 3, 2021.

(51) Int. Cl.
| F24H 4/04 | (2006.01) |
| B01D 21/26 | (2006.01) |
| C02F 1/38 | (2023.01) |
| F24H 1/08 | (2022.01) |
| F24H 15/262 | (2022.01) |
| F24H 15/375 | (2022.01) |

(52) U.S. Cl.
CPC ............. *F24H 4/04* (2013.01); *B01D 21/267* (2013.01); *C02F 1/38* (2013.01); *F24H 1/08* (2013.01); *F24H 15/262* (2022.01); *F24H 15/375* (2022.01)

(58) Field of Classification Search
USPC ........................................................ 122/14.1
See application file for complete search history.

(56) References Cited

U.S. PATENT DOCUMENTS

| 5,052,187 A  * | 10/1991 | Robinson, Jr. ............ F24H 4/04 |
| | | 62/238.7 |
| 5,094,739 A  * | 3/1992 | Kump .................. C02F 1/46176 |
| | | 210/717 |
| 5,305,614 A  * | 4/1994 | Gilles ..................... F24D 17/02 |
| | | 62/238.7 |
| 5,596,952 A  * | 1/1997 | Lannes ................... F24D 3/082 |
| | | 122/15.1 |
| 2012/0090559 A1* | 4/2012 | Yan ..................... F24D 19/1063 |
| | | 122/14.2 |
| 2021/0231348 A1* | 7/2021 | Or ............................. F24H 4/04 |
| 2021/0396428 A1* | 12/2021 | Chaudhry ............... F24H 7/002 |
| 2022/0196251 A1* | 6/2022 | Gurkaynak ............. H02P 27/08 |

* cited by examiner

*Primary Examiner* — Steven B McAllister
*Assistant Examiner* — John E Bargero
(74) *Attorney, Agent, or Firm* — Van Pelt, Yi & James LLP

(57) ABSTRACT

A water heater auxiliary heating system includes a heat pump. It further includes a first tap to circulate water from a water tank to a heat exchanger within the heat pump. It further includes a second tap to circulate water back to the water tank. The heat pump is controlled by an energy management system to preferentially operate based at least in part on a status of a site energy system that the energy management system is configured to manage. The water tank stores excess energy that is generated locally at the site energy system.

11 Claims, 7 Drawing Sheets

RETROFIT HOT WATER HEAT PUMP

CROSS REFERENCE TO OTHER APPLICATIONS

This application claims priority to U.S. Provisional Patent Application No. 63/275,120 entitled RETROFIT HOT WATER HEAT PUMP filed Nov. 3, 2021 which is incorporated herein by reference for all purposes.

BACKGROUND OF THE INVENTION

Heat pumps are energy efficient mechanisms for heating and cooling. It would be beneficial if they were more widely adopted.

BRIEF DESCRIPTION OF THE DRAWINGS

Various embodiments of the invention are disclosed in the following detailed description and the accompanying drawings.

DETAILED DESCRIPTION

Figure 1:
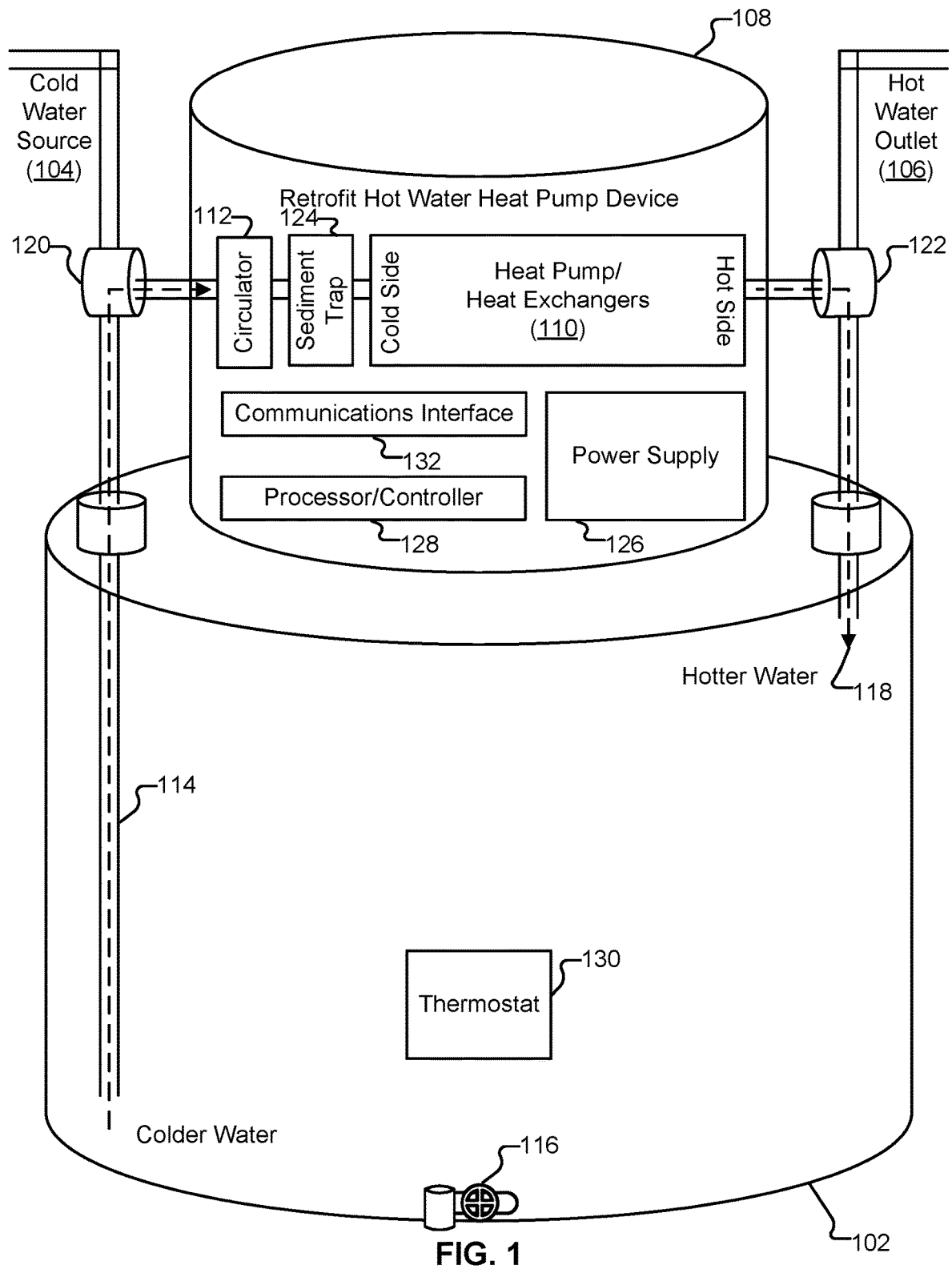
FIG. 1 illustrates an embodiment of an add-on hot water heat pump.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are embodiments of hot water heating systems that include heat pump units that are able to be retrofitted onto existing standard tank hot water heaters. Also described herein are embodiments of techniques for efficient installation and retrofitting of heat pump water heating units to existing standard tank hot water heaters. Further described herein are embodiments of incorporation of smart controls into the heat pump water heating unit, as well as integrated control options for controlling existing heating elements (e.g., in electric water heaters that are being retrofitted with the auxiliary heat pump units described herein). Embodiments of integrating the heat pump water heater into an intelligent home energy system are also described herein.

The majority of installed water heaters are either electric resistance water heaters or gas water heaters. A standard electric resistance water heater typically includes a number of large heating elements used to heat up the water in the tank. A typical electrical resistance water heater uses electricity to cause heating elements to heat up, where the heat is used to increase the temperature of the water in a water tank. A standard gas water heater has, at its bottom, a burner. The burner generates hot exhaust gases that touch a tube that goes up through the center of the tank. The heated tube then heats up the water in the tank.

Existing heat pump water heater architectures are all-in-one units that include a water tank integrated with a heat pump as a single unit. However, there are various challenges with installing existing all-in-one heat pump water heaters. For example, most existing heat pump water heaters operate at 240V. If a homeowner is replacing an existing gas water heater, an electrical panel upgrade is typically needed to install a 240V outlet for the all-in-one heat pump water heater. Further, although it would be energy efficient for homeowners to switch to using heat pumps to heat their water, they are unlikely to spend the time and effort to do so if their existing gas or electric water heaters are still working. As typical water heaters may last on the order of a decade, this would lead to slow adoption of installation of such all-in-one heat pump water heaters.

As described herein, rather than replacing an existing gas or electric water heater that is already installed and functioning, the existing hot water heater is augmented or retrofitted with a heat pump module device that is conveniently, efficiently, and reliably connected into the existing piping and plumbing to provide energy to heat up the water in the tank via the heat pump device. In this case, the heat pump device may be used as the predominant source of energy for heating up the water in the tank, where the existing gas or electric heating elements may be used as supplementary and/or backup heating sources. As one example, the heat pump may be used to heat up water the majority of the time, but if there is a sudden need or demand for hot water, the electric resistance or gas heating of the existing water heater may be used as backup.

Using the auxiliary heat pump-based hot water heater add-on device described herein, homeowners can sooner benefit from the efficiency of using a heat pump to heat their water, without having to replace an existing water heater that is still functioning, or without having to wait for their existing hot water heater to break before replacing it. Rather, the heat pump add-on utilizes the existing water reservoir of the existing hot water heater, which is capable of being heated by other energy resources such as electric resistance and gas, but is able to now instead be heated using the greater efficiency of heat pumps.

Using embodiments of the add-on heat pump device described herein, users can be converted to using heat pumps by taking their existing electric and gas water heaters and augmenting them with the heat pump functionality described herein to increase the proportion of their water that is more efficiently heated. In this way, more energy-efficient heating solutions may be utilized earlier, without waiting for homeowners to wait until their water heater breaks to upgrade them. Further, as will be described in further detail below, the add-on heat pump device may be retrofitted with minimal modification to existing piping or electrical circuitry, which further reduces the friction and investment (both in terms of cost and time) in converting homeowners to using more efficient heating solutions and mechanisms such as heat pumps. This provides the benefit of making more energy-efficient devices such as heat pumps more accessible and attractive to more users.

Embodiments of Retrofit Hot Water Heat Pumps

The following are embodiments of a heat pump-based auxiliary heating system that is able to be retrofitted onto existing water heater installations.

FIG. 1 illustrates an embodiment of an add-on hot water heat pump. In this example, an existing water heater is shown at 102. The existing piping to the existing water heater includes cold water inlet pipe 104 and hot water outlet pipe 106. Also shown in this example is the hot water heat pump add-on device 108.

In this example, the hot water heat pump device is designed to be installed on top of the existing hot water heater. As will be described in further detail below, this orientation of installation minimizes the impact on the existing water tank, where moving the tank (e.g., to place a heat pump below the existing water heater) may be difficult, or doing so would cause leaks. Using the hot water heat pump device described herein, only the existing piping at the top of the water heater needs to be modified during installation. As shown in the example of FIG. 1, the existing cold water inlet piping is tapped at 120, and the existing hot water outlet piping is tapped at 122.

In this example, the hot water heat pump device includes heat exchangers 110 (e.g., refrigerant to water heat exchanger), where the hot water heat pump, when performing heating, is configured to circulate water through the heat pump device and into the tank. The following is an example of the circulation loop. Colder water from the bottom of the tank is pumped up to the heat pump device. For example, the heat pump device includes a circulator 112 or pump (e.g., one watt pump) that is used to pull up the water from the bottom of the tank, up to the heat pump device. The inclusion of a circulator allows existing componentry of the existing hot water heater to be used to facilitate the drawing up of water. For example, as will be described in further detail below, the water is pulled up from the dip tube 114 in the tank, or via piping connected to the drain valve 116 of the existing water heater. In other embodiments, a thermosiphon is used to pull the cooler water from the bottom of the tank. As will be described in further detail below, by using a circulator, the existing plumbing of an existing hot water heater installation may be re-utilized, without modifying the existing water heater itself. This is in contrast to other heat pump solutions, where, for example, proprietary fittings are used in order to have refrigerant tubes run internally inside the tank as part of the heat exchanging.

The heat pump, using its heat exchangers, then heats up the water pulled up from the bottom of the tank. The heated-up water then enters the top of tank 118. As will be described in further detail, circulation and heating of water in this manner allows for maintaining a thermocline within the tank. In this example, the heat pump is configured to absorb or draw or extract energy from the surrounding air (e.g., in the garage or basement, wherever the existing hot water heater is installed), and transfer it to the water being circulated or moved through the heat pump (e.g., via refrigerant running through the heat pump, where the refrigerant loop carries heat from the outside air to heat up the water being passed through the heat pump device).

Figure 2:
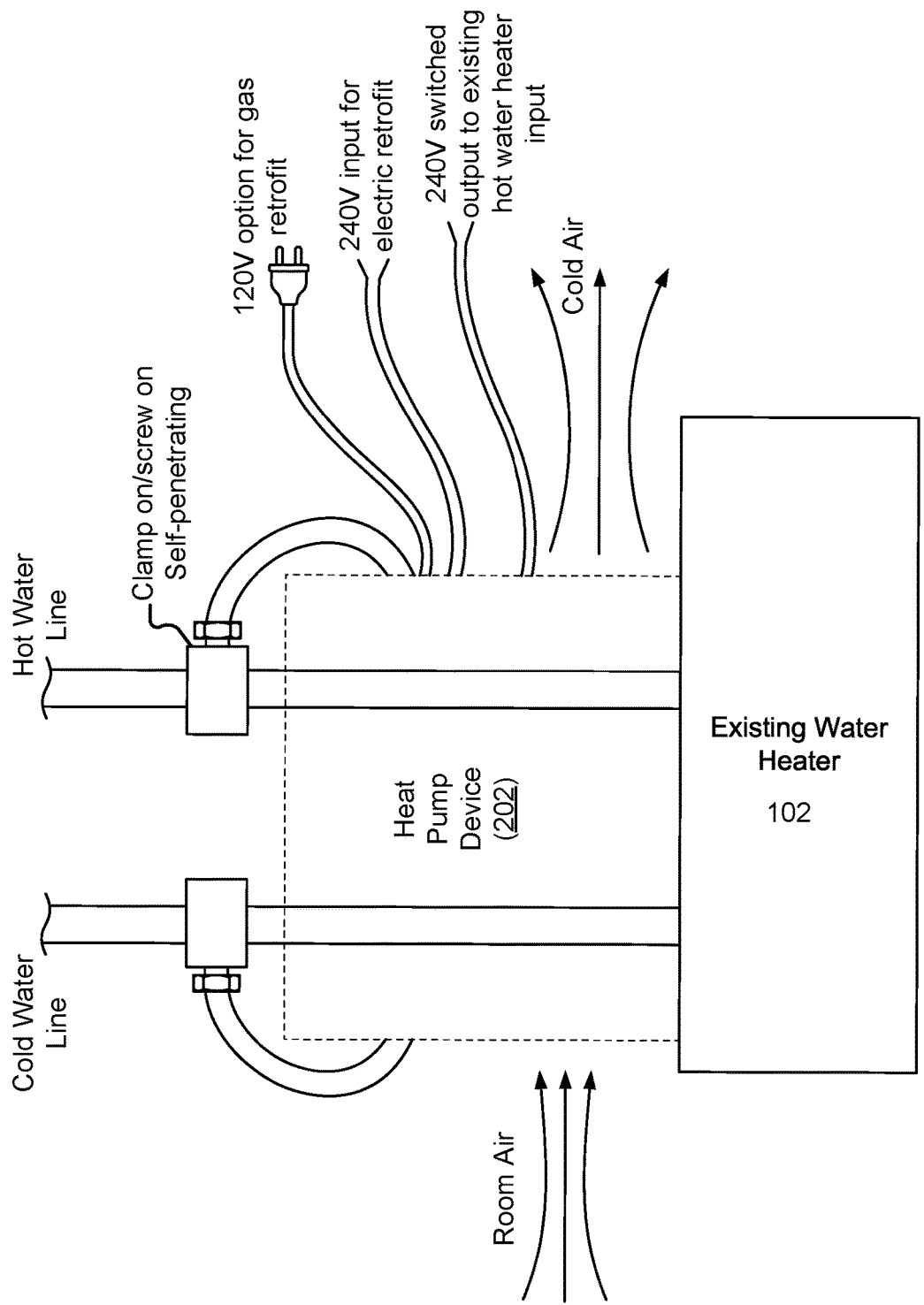
FIG. 2 illustrates an embodiment of the auxiliary heat pump device.

FIG. 2 illustrates an embodiment of the auxiliary heat pump device. In some embodiments, the hot water heating system of FIG. 2 is an alternative view of the heating system shown in FIG. 1. In this example, heat pump device 202 is an example of heat pump device 108 of FIG. 1. As shown in this example, the add-on heat pump device taps into the existing inlet and outlet lines of an existing tank-style hot water heater. As one example, clamp-on/screw-on self-penetrating taps are installed onto the existing cold and hot water lines. Further details regarding such taps are described below. Cold water is pumped out of the tank via the tap in the cold water line. The water is heated as it passes through the heat pump unit, which draws heat from the ambient air in the space surrounding the water heater. The heated water is then put into the top of the water tank via the tap in the hot water line.

In some embodiments, the heat pump device includes a heat pump circuit with a liquid-to-liquid heat exchanger on the hot side, and a liquid-to-air heat exchanger on the cold side. The liquid-to-liquid heat exchanger on the hot side is configured to transfer heat from the hot-side refrigerant to the circulating water. The liquid-to-air heat exchanger on the cold side is configured to draw heat from ambient air that is drawn through the device by a fan or other fluid driver/circulator, and transfers it to the cold side refrigerant.

Facilitating Efficient Installation

As will be described in further detail below, the add-on heat pump device is designed to be efficiently and quickly retrofitted to existing hot water heater installations, with minimal to no plumbing and/or electrical modifications. This allows the heat pump device to be retrofitted and installed expediently, without requiring electricians and plumbers to redo connections in order to install or integrate the heat pump device onto the existing hot water heater.

Utilizing Existing Piping or Lines

The following are embodiments of techniques for connecting the add-on hot water heat pump device to an existing hot water heater. Utilizing existing piping of existing water heater installations increases the ease of installation of retrofitting the add-on heat pump device. The following are embodiments of tapping into existing piping systems to facilitate improved ease of installation of the auxiliary heat pump device described herein.

As one example, the cold water inlet and hot water outlet pipes are cut and refitted with T-shaped fittings, which may have built-in check values and bleed valves, which are then used to connect to the retrofit heat pump device. For example, a short segment may be cut out of the existing hot and cold water lines, where a fitting is connected to the gap. For example, push-on fittings or flexible fittings may be used that connect to the appropriate terminals of the heat pump device. Further details regarding the t-shaped fitting are described below in conjunction with FIG. 3.

Figure 5:
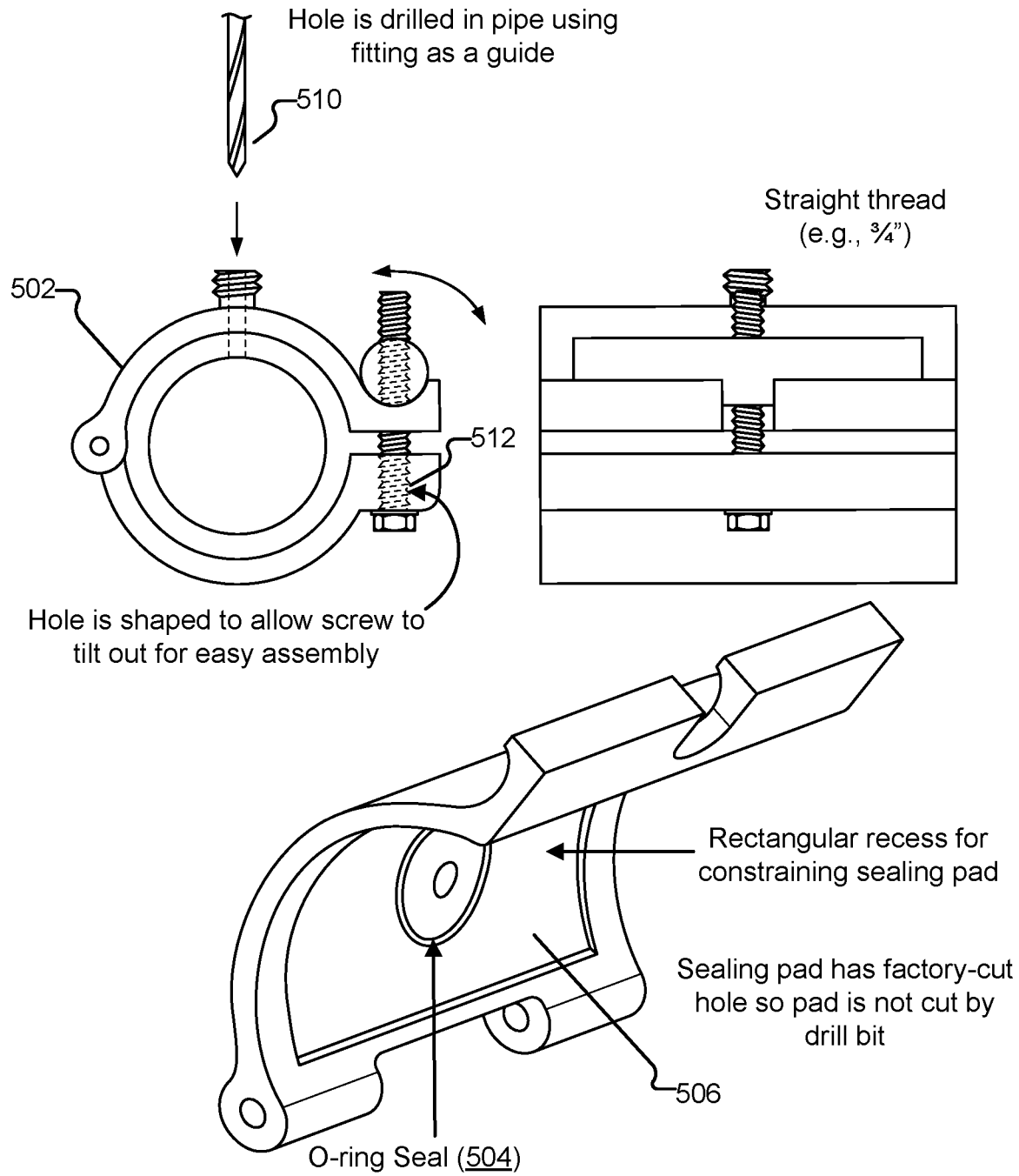
FIG. 5 illustrates an embodiment of a water line connection.

As another example, using embodiments of the techniques described herein, installation of the heat pump device is designed to be efficient even for hard-pipe (e.g., non-flex pipe) installations by tapping directly into the existing lines, in many cases without cutting into them. One example of a rapid connection technique is to use a saddle-style tee that clamps onto a pipe. A hole is then drilled into the side of the pipe, and the clamp seals securely around the hole. This provides a standard fitting attachment for hot water heater flex lines. Flex lines on the heat pump device are then threaded onto the new clamp-on self-penetrating fittings. In this example, a valve such as a saddle valve is used to connect the existing piping to the retrofit heat pump device. With the use of a saddle valve, no cutting of the existing piping is required. An example of such clamp-on, self-penetrating fittings is shown in the example of FIG. 5.

The following are additional embodiments of water line connections.

Figure 3:
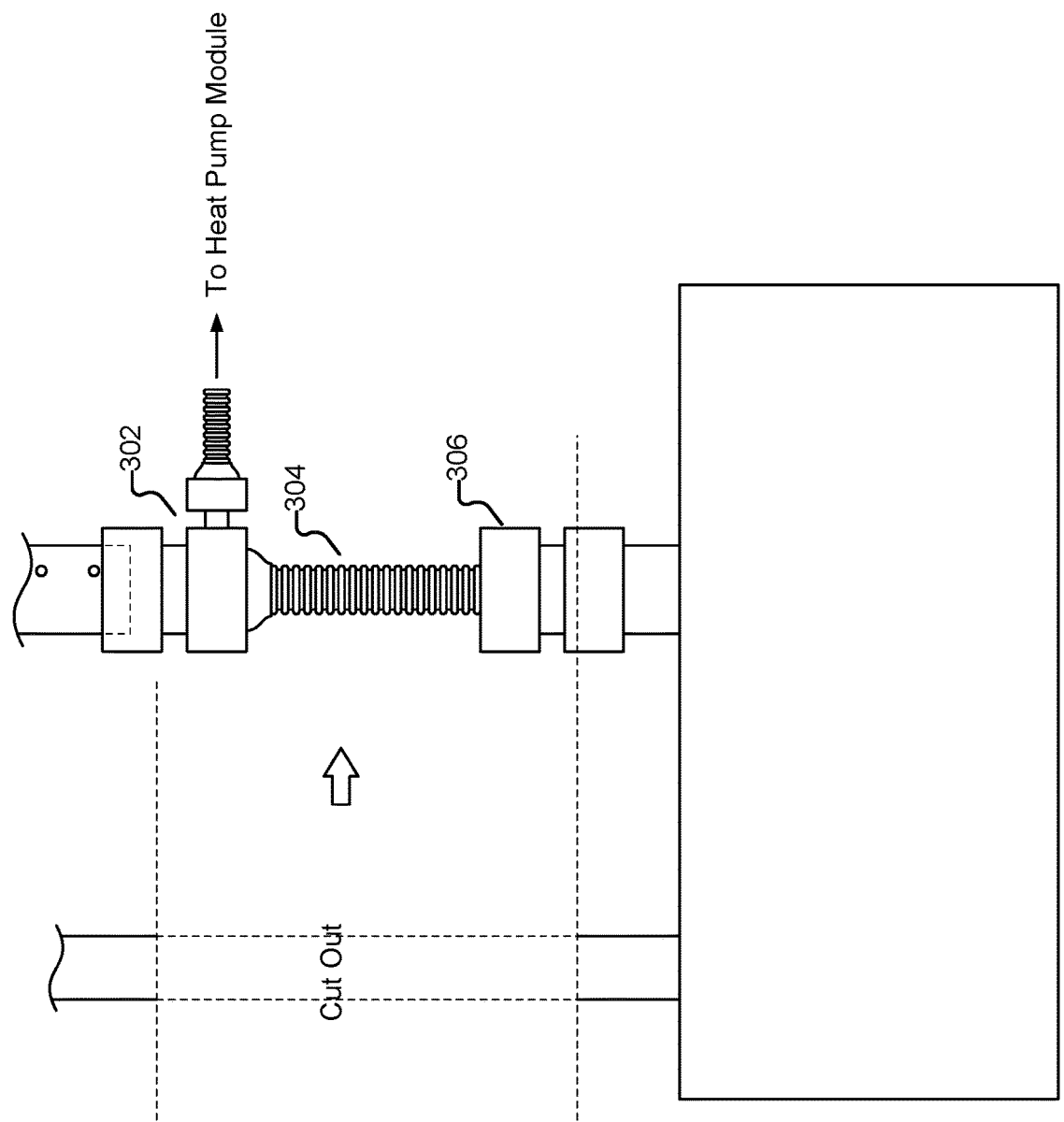
FIG. 3 illustrates an embodiment of a water line connection.

FIG. 3 illustrates an embodiment of a water line connection. The example of FIG. 3 shows a push-connect fitting with tee (302), as well as a flex line (304) with push-connect fitting (306) on the other end. In some embodiments, this tap is installed by cutting out a section of pipe (e.g., hard copper pipe), and using the flexibility of a flex line to allow push fittings to be installed. This type of tap may be installed on the cold water inlet line and/or hot water outlet line.

Figure 4:
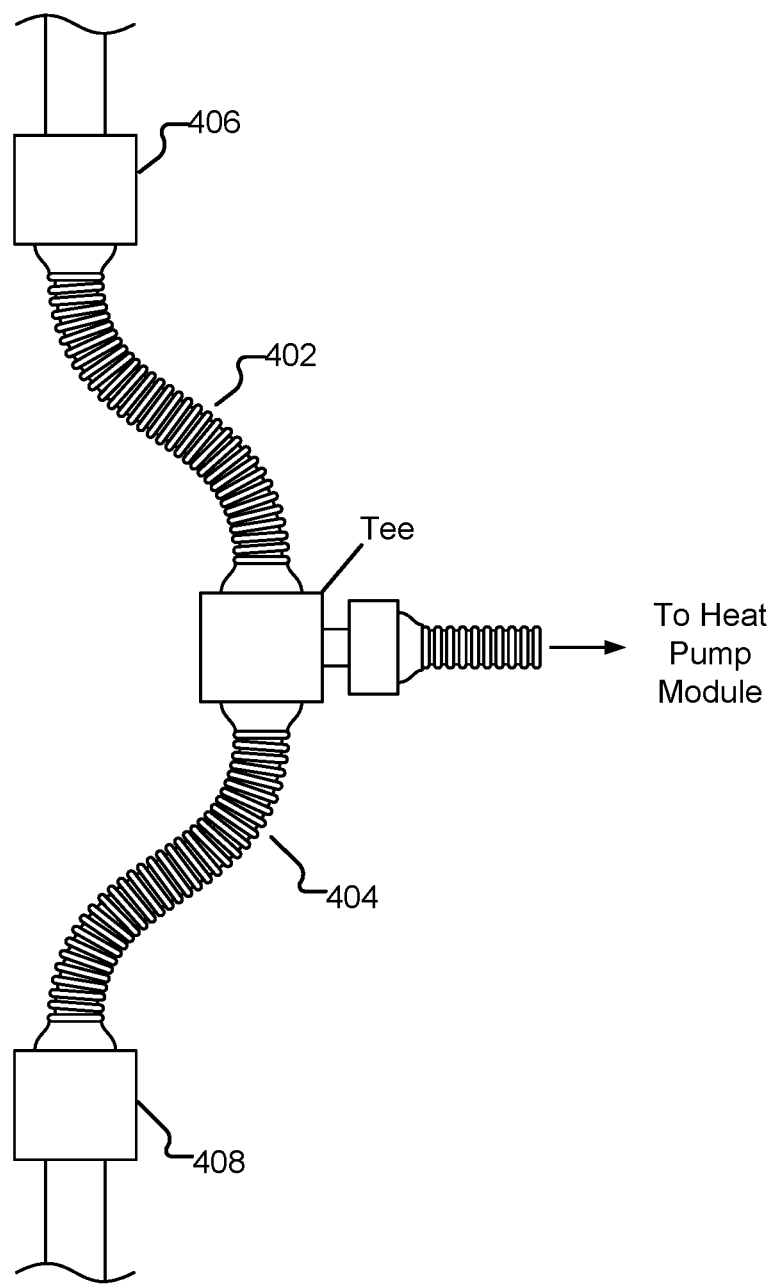
FIG. 4 illustrates an embodiment of a water line connection.

FIG. 4 illustrates an embodiment of a water line connection. The example of FIG. 4 shows a tee fitting with two flex lines (402 and 404), each with push-connect fittings on their ends (406 and 408). In some embodiments, this type of tap or connection is installed by cutting out a section of pipe and using the flexibility of flex lines to allow push fittings to be installed. In other embodiments, if there are existing flex lines (rather than hard copper pipe, for example), then they are replaced by the tee/flex line assembly shown in the example of FIG. 4, but adapted with straight-thread ends on the flex lines for connection (rather than the push-connect fittings, which are used to fit onto hard pipe). This type of tap may be installed on the cold water inlet line and/or hot water outlet line.

FIG. 5 illustrates an embodiment of a water line connection. The example of FIG. 5 shows an embodiment of a clamp-on saddle tee. In some embodiments, a saddle 502 is clamped around a pipe using a built-in screw mechanism. In some embodiments, an O-ring 504 and/or sealing pad 506 is used to make a seal around a tee outlet hole. In some embodiments, a hole in the pipe is drilled through the tee hole while the clamp is in place, as shown at 510.

In the example of FIG. 5, as described above, a hole is drilled in the pipe being tapped, as shown at 510. In some embodiments, the fitting is used as a guide. At 512, a hole is shaped to allow a screw to tilt out for easy assembly. As shown at 506, in some embodiments, the clamp includes a rectangular recess for constraining the sealing pad. In some embodiments, the sealing pad has a factory-cut opening or hole so that the pad is not cut by the drill bit.

Compatibility with Home Electrical Wiring

In some embodiments, the auxiliary heat pump device is designed to minimize any electrical work that needs to be done as part of retrofitting the auxiliary heat pump device onto an existing hot water heater. In this example, the heat pump device operates at 120V AC (Alternating Current). In some embodiments, the compressor of the heat pump is designed such that the heat pump operates or is compatible with a 120V AC (an example of standard residential voltage in the US) power supply (e.g., power supply 126). This is in contrast to being only able to operate at 240V. Existing heat pump water heaters and the majority of heat pumps utilize 240V AC, and when being installed to replace a gas water heater, often require upgrading the electrical circuitry of the home (e.g., to install another 240V outlet), which creates another barrier to the use of heat pumps in the water heater context. While a heat pump that operates with a 120V AC electrical connection is described herein for illustrative purposes in a North American standard residential context, other electrical standards and values may be used in other jurisdictions, as appropriate.

Thus, ease of installation is improved, as for gas tank retrofits, the auxiliary heat pump device is capable of being powered by plugging into a standard 15A, 120V outlet (as opposed to requiring electrician work to add a 240V outlet).

In this way, electrical work is minimized and the need for an electrician is eliminated in the case of a gas heater retrofit because the heat pump device is configured with a standard 120V power cord that can be plugged into any 15A outlet, even using a properly rated extension cord, if desired.

In some embodiments, for electric tank retrofits (which typically have a 240V power supply), the power supply 126 of the auxiliary heat pump device is configured with a 240V input and a switched 240V output, as shown in the example of FIG. 2. In some embodiments, the input is wired to the existing 240V supply for the water heater, and the switched output is wired to the existing heater's input. This also provides the heat pump device control over when the existing electric resistance heating elements are used. Further details regarding control of the existing heating elements of the existing hot water heater are described below.

Maintaining a Thermocline in the Water Tank

Hot water heaters operate based on a buoyancy effect (where hot water is at the top of the tank), and where heat is stored in a thermocline. With the thermocline, different temperatures of water are at different levels in the water tank, and, when not disturbed (e.g., not actively mixed or swirled together), there is a temperature differential from hot water at the top of the tank, to cold water at the bottom of the tank. That is, even though the fluid (e.g., water) in the tank is touching, because it is not disturbed, the fluid is able to hold a strong temperature differential.

The add-on retrofit heat pump device described herein is configured to circulate the water in the tank of the existing water heater in a manner that maintains the thermocline. In some embodiments, the add-on retrofit heat pump device described herein is designed to reuse existing plumbing or piping (of an existing hot water heater installation) in a manner that does not disturb the contents of the water tank in order to maintain the existence of the aforementioned thermocline (because once the water is mixed up, this will result in an adverse effect of lukewarm water being delivered).

As shown in the example of FIG. 1, the retrofit heat pump device, for ease of installation, is installed at the top of the hot water heater. In this example, the retrofit heat pump device includes a circulator or pump to bring cold water up from the bottom of the tank to be heated up. The heated water is then placed at the top of the water tank. In this way, the coldest water is at the bottom of the tank and the hottest water is at the top of the tank, thereby maintaining the thermocline used to store thermal energy.

Various existing components of existing hot water heater installations may be utilized to facilitate circulation of water through the auxiliary heat pump device.

As another example, the dip tube of the existing hot water heater (e.g., dip tube 114 of FIG. 1) is used. In typical water heaters, the dip tube goes down approximately three-quarters of the way into the tank. The dip tube is used to take the cold water coming in the cold water line (from a source external to the home) and allows cold water to be injected into the tank at its bottom. That is, the dip tube directs the cold water from the cold water supply to the bottom of the tank. In some embodiments, during heating, the dip tube is reused by the heat pump, where the circulator pulls up cold water from the bottom of the tank via the dip tube, and heats it up. In some embodiments, during installation, the dip tube is inspected. If needed, a new dip tube is put into the tank. As one example, a proprietary dip tube that has a diffuser at its end (e.g., by including small holes or perforations in the sides of the tube) is installed that allows cold water to be let out smoothly into the tank. The heated water is then passed back to the top of the tank by using the piping for the hot water outlet that takes hot water from the top of the tank and delivers it into the home. During heating, that piping is reused to direct the heated water to the top of the tank. During charging (heating of the water in the tank), the thermocline will progressively move down as the amount of hot water increases.

As another example, rather than using the dip tube to pull up colder water from the bottom of the tank, the heat pump is tied to the drain valve (e.g., drain valve 116), which is typically located at the bottom of standard water heaters. In some embodiments, the drain valve is utilized to recirculate water effectively. For example, piping is installed to connect the drain valve to the input of the heat pump. This allows the coldest water (e.g., at the bottom-most reaches of the tank) to be pulled up for heating. In this way, the circulator of the add-on heat pump device pulls cold water from the bottom of the tank, and pushes the hot water onto the top of the tank. By making the cold water connection through the drain at the bottom of the tank (instead of tapping the cold water supply line), more of the tank volume may be utilized.

Sediment Trap

Electric resistance and gas water heaters, depending on water quality, will develop scale deposits at the bottom of the tank. Over time, those scale deposits will cover up the drain valve or drain hole, or cover up the dip tube exit. If water is pulled up from the dip tube (e.g., as part of circulation through the heat pump), then such sediment will also be pulled up. In some embodiments, the add-on heat pump device includes a sediment mitigation mechanism, such as sediment trap 124 of FIG. 1. As one example, the sediment trap is configured to trap and filter out sediment that is pulled up along with the water to be heated, so that the sediment is not pushed through the heat exchangers of the heat pump device.

In some embodiments, the sediment is also returned back down in the tank. As one example, occasional reversals of flow via the circulator are used to backflow the filter. In some embodiments, such a flow reversal also gushes a high-velocity slug of fluid out of the dip tube to dislodge or clean sediment from around the inlet of the dip tube. The normal flow direction and velocity is such to not disturb the newly formed 'crater' in the sediment. As another example, a centrifugal cyclone particle separator is used that continuously filters out the sediment and dumps it back into the hole normally reserved for the anode rod. In some embodiments, a flow-through replacement anode rod is used to accommodate the flow path. In some embodiments, during the installation process, old anode rods are replaced, and a sediment flush is performed. Such maintenance would also further ensure the longevity of the heat pump's performance.

Embodiments of Operation of the Heat Pump Module

The following are embodiments of operation of the heat pump device described herein.

In some embodiments, the heat pump module is configured to slowly circulate water through itself in order to measure hot water temperature. In some embodiments, water is drawn through the dip tube (or drain valve) from the bottom of the water tank (e.g., using the circulator or pump described above). In some embodiments, based on measured temperature, as well as other factors such as time-of-use electricity pricing and present time of day, or utility-requested demand-response behavior, the heat pump determines whether to run to heat up the water in the water tank. In some embodiments, the heat pump device is integrated into a home energy system, where there is an energy management system that is configured to control the operation of the heat pump module according to the aforementioned factors. Further details regarding the integration of the auxiliary heat pump device with an energy management system are described below.

In some embodiments, after adding on the heat pump device, the heat pump is utilized as the primary mechanism for heating up the water in the tank. The existing heating elements of the existing water heater may be used as backup. As one example, the thermostat(s) for the existing heating elements may be set to only turn on when the temperature is very low, so that the heat pump will remain the primary heating source.

In some embodiments, when installing the add-on heat pump device, the add-on heat pump device is wired to the existing controller/thermostat. As another example, the existing thermostat is removed or deactivated. In some embodiments, the add-on heat pump device includes a controller (e.g., controller 128 of FIG. 1), where the heat pump device may be used to control the now backup heating elements (e.g., existing gas or electric resistance heating sources). This allows for finer grain control of when and how to heat up the water tank. For example, pre-charging the tank by heating the water for above average may be performed.

In some embodiments, in the case of augmenting an existing gas heater with the add-on heat pump system described herein, the existing thermostat (e.g., existing thermostat 130 of FIG. 1) should be set to a lower temperature which will result in the gas heater activating if the heat pump fails to maintain the temperature above that point. This will ensure that the gas heater turns on in rare cases and the majority of water heating is done through the heat pump.

In some embodiments, in the case of augmenting an existing electric water heater with the add-on heat pump system described herein, the existing thermostat should be set to a higher temperature, allowing the heat pump module to take control of the heating elements by switching power on and off to the existing hot water heater. It may use them when necessary or appropriate for the present objective of the module controller. In some embodiments, this is used predominantly for heating when the heat pump is unable to keep up with demand and maintain a certain water temperature, similarly to the gas heater.

Intelligent Control of the Hot Water Heat Pump

In some embodiments, the add-on heat pump device is integrated into an energy management system local to a site (e.g., a home). In some embodiments, the heat pump module is controlled by a controller with a processor (e.g., controller 128 of FIG. 1) and communication system (e.g., communications interface 132 of FIG. 1) for communicating with a home controller or with the internet, allowing for connectivity-based features to be implemented such as the real-time pricing based controls described above, and for firmware updates and for reporting of telemetry either to the cloud or directly to a home controller. Examples of communications interfaces include interfaces for 900 MHz communication, power line communications, WiFi, etc. In some embodiments, the smart home controller includes load control firmware, and supports seamless off-grid smart load management when installed in a home with a battery storage system (e.g., to control whether the heat pump module is on or off or running at a certain power level when the home energy system is off grid).

Figure 6:
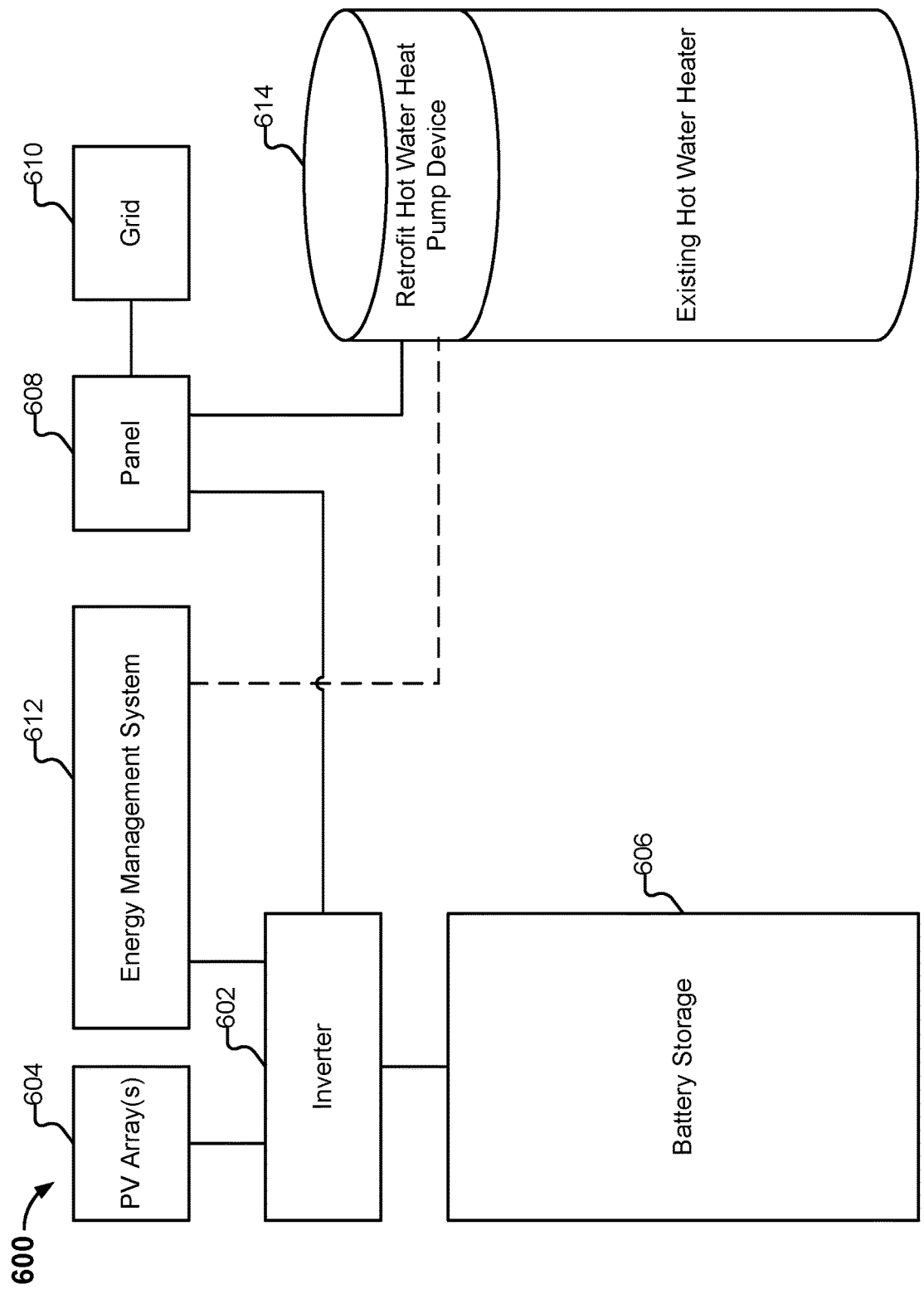
FIG. 6 illustrates an embodiment of an energy system.

FIG. 6 illustrates an embodiment of an energy system. In this example, an energy system local to a site such as a home is shown. As shown in this example, the home energy system 600 includes an inverter 602, PV (photovoltaic) array 604, and battery storage device(s) 606. The inverter is configured to take as input DC (Direct Current) power from the PV array and battery storage devices, and converts it to AC (Alternating Current) power that is deliverable to load devices (e.g., that are connected to breaker panel 608). The inverter is also connected to the utility grid 610.

The home energy system further includes energy management system 612. In some embodiments, the energy management system is configured to manage the various components of the home energy system. In some embodiments, the energy management system is a computing device which, as one example, is included as part of an inverter subsystem. In other embodiments, the load management module is implemented in a separate on-premise device at the site (e.g., home), such as in a standalone console or hub. In other embodiments, the energy management system is implemented at a backend, in the cloud. A hybrid management scheme may be used, where energy management is distributed across a computing device local to the home, as well as at a backend server.

In some embodiments, the energy management system is configured to act as a home controller. For example, the energy management system is configured to manage loads in the home's electrical network by controlling their behavior. In some embodiments, the energy management system utilizes a global view of the battery storage, PV solar power production, inverters, loads, etc. to intelligently optimize whole-home energy management.

For example, auxiliary heat pump device 614 (which in some embodiments is an example of heat pump module 108 of FIG. 1) is controlled by the energy management system to preferentially operate based on a status of the home energy management system local to the site. For example, as shown in FIG. 6, the home energy system is integrated with batteries and a photovoltaic (PV) array. In some embodiments, if there is excess solar energy generated at the energy management system, the excess solar energy is stored thermally in the water tank of the existing hot water heater by controlling the heat pump device to turn on and use the excess solar power that is currently being generated to heat up the water in the tank.

In various embodiments, the energy management system is configured to control the operation of the heat pump based on various factors, such as predicted demand for hot water, different costs of energy at different times (which may be used, for example, to determine whether to pre-charge or super heat the heat pump), excess solar energy being generated, etc.

For example, as described above, the energy management system manages the powering of loads using resources such as solar power or battery power. The loads may be electrical loads as well as thermal loads (that are heated or cooled via devices that are powered by electricity). In some embodiments, the energy management system is also configured to predict or forecast demand for thermal loads (e.g., for hot water). For example, the energy management system is configured to record when hot water is being used in the home over time. Based on analysis of historical data on the usage of hot water, patterns of hot water usage are determined. In this way, the energy management system predicts when there will be demand for hot water. Based on the predicted demand for hot water, and the real-time (or forecasted) determination of power generation (e.g., solar power generation), the energy management system controls charging of the thermal energy storage (e.g., heating of the water in the water tank). That is, the energy management system is configured to manage the "thermal battery" that is the water tank.

As one example, suppose that there is a large amount of excess solar power. The controller of the heat pump may be instructed to turn on the existing electric resistance element, along with the heat pump, to use as much excess solar power as possible to heat up the water in the hot water tank as much as possible. In this way, demand charges and high rates when on time of use plans may be avoided at later times when the hot water is actually needed (e.g., at night for showering), as hot water needed during those times has already been heated earlier using excess solar and/or battery charge. Further, instead of excess solar energy going to the grid, it is instead "banked" in hot water. In this way, the hot water heater is used as a thermal battery.

In some embodiments, the water in the tank is allowed to be heated up to a temperature that is higher than what is allowed to be outputted to the home. For example, suppose that based on code regulations, the water provided to the home is allowed to have a maximum temperature of 140 degrees. In some embodiments, when there is excess solar, the water in the hot water tank is allowed to be "super" heated up to 180 degrees Fahrenheit. This way, even if the water cools down ahead of the predicted peak usage time (e.g., at night time if a household showers or bathes then), it will still be at a high enough temperature for use. In some embodiments, a thermostatic mixing valve is installed on the outlet of the hot water tank to regulate the temperature of the water to be at or below 140 degrees Fahrenheit (or the allowed temperature), even if the water has been allowed to heat up to an even higher temperature.

The following are further examples of controlling the operation of an auxiliary, retrofitted heat pump device to optimize the usage of excess solar power. As one example, suppose that a home generally has excess solar power later in the day that goes unused, because the battery storage is typically full by that point. Typically, in existing systems, if there are no loads to consume the excess solar power, and there is no more capacity in the battery storage to absorb the excess solar power, then the excess solar power is sent to the grid. However, the homeowner may not be paid for the excess solar power sent to the grid (e.g., because the rates are reflective of the fact that the solar power would not be helpful to the utility). In some embodiments, the energy management system leverages the heat pump to utilize excess solar power, rather than allowing it to be wasted. For example, the excess solar power is distributed or time shifted by converting it to other types of energy storage, such as thermal storage. The time shifting of the excess solar power is performed, for example, by controlling loads, such as the heat pump water heater, that are not time sensitive, to absorb the excess solar power for later use, preventing the excess solar power from being wasted, and thereby improving the efficiency of the usage of the photovoltaic (PV) power.

As one example, suppose that the hot water heater has been off all morning. In some embodiments, the energy management system controls the heat pump unit (e.g., by sending a set of instructions or commands to the heat pump device, which are received via the communications interface 132, and executed by the controller/processor 128 of the heat pump device) to turn on and heat the water in the water heater when there is excess solar power so that the water heater can absorb the excess solar energy, by using it to heat the water in the tank to be used at a later time. In this way, the excess solar energy is effectively stored thermally (e.g., converted to heating water, where the heat generated using solar power is retained in the water), where the heated water may be used later on in the evening.

On the other hand, if the hot water heater happens to be on, and the energy management system determines that there is currently not excess solar, and has identified the water heater as a load that can be turned on at a later time (e.g., based on a prediction of excess solar later in the day), the energy management system engine, as one example, sends a real-time signal to the heat pump device, instructing it to turn off the water heater for now (e.g., until excess solar power is detected, at which point the energy management system sends an instruction to the heat pump device to turn on, as described above).

In this way, the usage of some of the solar energy is time shifted, where the solar energy is stored thermally in the water, and where the heated water may be used at a later time (compared to when the excess solar energy was generated). By controlling when and how the excess solar power is used, the energy management system described herein optimizes the value of the energy that is produced and consumed. This is one example of how the behavior of the home energy system can be optimized using an intelligently controllable heat pump device such as that described herein.

Time-shifting of excess solar energy using the techniques described herein provides various other benefits as well. For example, by storing solar energy (that would otherwise have been wasted) in other forms, such as thermally (e.g., by using the heat pump to heat water in the water tank), the home energy system can be designed with a smaller amount of battery storage (as the battery need not be relied upon as much to heat water). That is, the home's hot water is used as thermal energy storage, allowing the homeowner to maximize the value of their energy system with fewer batteries. This reduces the cost of the energy system needed to power the home (as additional batteries are not needed to capture excess solar energy), or, for the same sized system, more value may be extracted.

Figure 7:
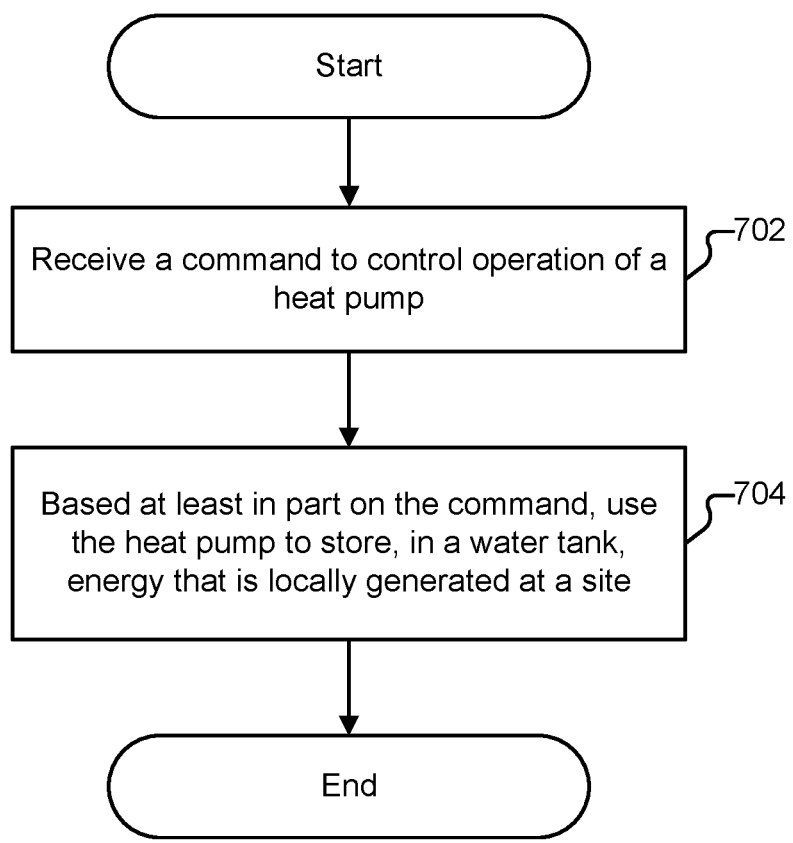
FIG. 7 is a flow diagram illustrating an embodiment of a process for controlling operation of an auxiliary heat pump device.

FIG. 7 is a flow diagram illustrating an embodiment of a process for controlling operation of an auxiliary heat pump device. In some embodiments, process 700 is executed by heat pump system 108 of FIG. 1. The process begins at 702 when a command to control operation of a heat pump is received. The heat pump is included in a water heater auxiliary heating system, and is used to heat water in a water tank. In some embodiments, the command is sent by an energy management system such as that described above. In some embodiments, the energy management system is included in a site energy system. The heat pump is controlled to operate in a manner that is based on a status of the energy management system (e.g., based on predicted demand for hot water, differential costs of energy, excess solar energy being produced, etc., as described above).

At 704, based at least in part on the command, energy that is generated locally at the site energy system is stored in the tank by using the heat pump to heat water in the water tank. For example, suppose that the site energy system is associated with a site that includes a local PV array. In some embodiments, excess solar energy being produced is stored in the water tank by using the excess solar energy to supply power to the heat pump, which then uses the excess solar energy to heat up water in the water tank. In this way, the excess solar energy has been converted to thermal energy, where the intelligent heat pump water tank is operated as a thermal battery by the energy management system.

Embodiments of a water heater auxiliary heating system have been described. In some embodiments, the water heater auxiliary heating system includes a heat pump. It further includes a first tap to circulate water from a water tank to a heat exchanger within the heat pump. It further includes a second tap to circulate water back to the water tank. The heat pump is controlled by an energy management system to, for example, preferentially operate based on a status of the energy system at a site. The water tank is controlled, for example, to store excess energy generated locally at the site.

The following are additional embodiments of the auxiliary heat pump system described herein.

In some embodiments, the heat pump device is connected to the drain/sewer system, and is configured to draw heat from the cold water inlet line, instead of the ambient air. The cold water, which is now colder due to the heat extraction, is then directed into the drain/sewer line.

In some embodiments, the heat pump system is configured to connect to a duct or chimney that leads to an outdoor environment. Outlet air may be vented through the duct, or inlet air may be drawn through the duct. This allows for various options as to where to draw air from, and where to push it, in order to optimize energy consumption while accounting for the space heating or cooling needs of the home.

In some embodiments, the cold-side heat exchanger is a drain pipe heat recovery style heat exchanger. In some embodiments, if hot water is being used, the drain line becomes warmed from the drain water, in which case the heat pump may more efficiently draw heat from the drain.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A water heater auxiliary heating system, comprising:
   a heat pump;
   a first tap to circulate water from a water tank to a heat exchanger within the heat pump; and
   a second tap to circulate water back to the water tank;
   wherein the heat pump is controlled by an energy management system to preferentially operate based at least in part on a status of a site energy system that the energy management system is configured to manage;
   wherein the water tank stores excess energy that is generated locally at the site energy system;

wherein in the event that the water heater auxiliary heating system augments an existing gas heater, an existing thermostat setting associated with the existing gas heater is set to a lower temperature than a temperature associated with a heat pump activation threshold, and wherein in the event that temperature of the water is lower than the existing thermostat setting and the heat pump has been continually activated, the existing gas heater is activated.

2. The water heater auxiliary heating system of claim 1, wherein the site energy system comprises an inverter, a PV (photovoltaic) array, a battery storage device, and a connection to a utility grid.

3. The water heater auxiliary heating system of claim 1, wherein the water tank is associated with an existing electric heater or the existing gas heater.

4. The water heater auxiliary heating system of claim 1, wherein the energy management system is configured to forecast a thermal load.

5. The water heater auxiliary heating system of claim 1, wherein the auxiliary heating system is retro-fitted to an existing hot water heater, and wherein the water tank comprises a reservoir of the existing hot water heater.

6. The water heater auxiliary heating system of claim 5, wherein the auxiliary heating system is installed above the existing hot water heater.

7. The water heater auxiliary heating system of claim 1, further comprising a circulator.

8. The water heater auxiliary heating system of claim 7, wherein the circulator is configured to pull up water to be heated via a dip tube in the water tank.

9. The water heater auxiliary heating system of claim 7, wherein the circulator is configured to pull up water to be heated via a connection to a drain valve of the water tank.

10. The water heater auxiliary heating system of claim 1, further comprising a sediment trap to trap sediment that is in the water to be heated.

11. The water heater auxiliary heating system of claim 1, wherein:

in the event that the water heater auxiliary heating system augments an existing electric heater, an existing thermostat setting associated with the existing electric heater is set to a higher temperature than a temperature associated with a heat pump activation threshold; and in the event that a temperature of the water is lower that the existing thermostat setting and the heat pump has been continually activated, the existing electric heater is activated.

* * * * *